United States Patent
Romero

(10) Patent No.: US 6,589,691 B2
(45) Date of Patent: Jul. 8, 2003

(54) STRUCTURAL FEED THROUGH ARRANGEMENT FOR LITHIUM ION CELLS

(75) Inventor: Antonio Romero, Parkton, MD (US)

(73) Assignee: Alcatel, Paris (FR)

( * ) Notice: Subject to any disclaimer, the term of this patent is extended or adjusted under 35 U.S.C. 154(b) by 210 days.

(21) Appl. No.: 09/737,956

(22) Filed: Dec. 18, 2000

(65) Prior Publication Data

US 2002/0076609 A1 Jun. 20, 2002

(51) Int. Cl.$^7$ .............................. H01M 2/26; H01M 2/06
(52) U.S. Cl. ..................... 429/181; 429/65; 429/121; 429/183; 429/182
(58) Field of Search .................... 429/65, 121, 170, 429/179, 181, 182, 185, 178, 180

(56) References Cited

U.S. PATENT DOCUMENTS

| | | | |
|---|---|---|---|
| 4,012,562 A | 3/1977 | Saunders | 429/103 |
| 4,064,725 A | 12/1977 | Hug et al. | 72/147 |
| 4,158,300 A | 6/1979 | Hug et al. | 72/148 |
| 4,283,843 A | 8/1981 | Hooke | 29/623.1 |
| 5,326,655 A * | 7/1994 | Mix et al. | 429/178 |
| 5,856,041 A | 1/1999 | Inoue et al. | 429/182 |
| 6,218,040 B1 * | 4/2001 | Romero | 429/61 |
| 6,399,237 B1 * | 6/2002 | Souliac et al. | 429/56 |

* cited by examiner

Primary Examiner—Patrick Ryan
Assistant Examiner—Tracey Dove
(74) Attorney, Agent, or Firm—Sughrue Mion, PLLC

(57) ABSTRACT

A feed through arrangement for a battery cell which transfers torque that is applied to the terminal into a plurality of smaller compression forces. The arrangement permits a high torque on the terminal without damaging the seals of the feed throughs. Preventing damage to the seals increases the durability and accordingly the life of the battery. The seals of the present invention are also hermetic to moisture, have excellent thermal-shock properties and have a very low impedance, volume and weight.

13 Claims, 3 Drawing Sheets

STRUCTURAL FEED THROUGH ARRANGEMENT FOR LITHIUM ION CELLS

BACKGROUND OF THE INVENTION

1. Field of the Invention

The present invention relates to a structural design for lithium ion cells. More specifically, this invention is directed to a structural design for a cell feed-through arrangement that permits a high torque on the cell terminal post connection, wherein the feed-through has a very low impedance, volume and weight, presents excellent thermal shock properties and is hermetic to moisture.

2. Background of the Related Art

Lithium ion cells are used frequently in many of today's products. They are used in a wide variety of consumer and industrial products. As with any type of battery, the use life of the cells is extremely important. Through the years, technology has increased the use life of all types of batteries by making the batteries more durable. Batteries have become more durable because their designs have gotten better. Therefore, battery cells that have been designed to be more durable consequently increase the use life of the battery. Designing a more durable cell continues to be a goal of battery producers everywhere.

A major problem that occurs that affects the durability of a battery is the breakdown of the seals that are necessary to keep electrolyte within the battery. Seals can breakdown or be damaged for many reasons, some of which include moisture, thermal-shock and shear torque between the seal and its adjacent component. If damage to the seal can be prevented, then the durability of the battery can be increased thereby increasing the life of the battery. The design of the battery is directly related to the damage that is cause to the seals.

Problems occur when the design of the battery is such that the feed-through is directly connected to the external terminal of the battery. A feed-through, sometimes referred to as a pass-through, is a "hole" in the cell housing that allows the external terminal of the battery to pass through the cell housing to be in contact with the electrolyte within the battery. These "holes", or feed-throughs, are slightly larger than the external terminal of the battery. This size difference creates a gap in the feed-through between the terminal and the cell housing. This gap is filled through the use of a seal. Therefore, in the conventional battery, the seal is in direct contact with the external terminal of the battery.

When the seal is in direct contact with the external terminal of the battery, any torque applied to the external terminal is applied directly to the feed-through and to the feed-through's seal. This torque applied to the seal causes damage to the seal thereby reducing the life of the battery.

Along with the physical design of the battery, the type of seal that is used in the feed-through affects the durability and consequently the life of the battery. Batteries are subjected to many various types of environments. If any of the environments to which the battery is exposed contains contaminants or moisture, the seal becomes extremely important. The seal acts as a protective barrier. It serves to prevent any of the contaminants or moisture from reaching the interior of the cell. In order to properly accomplish this, the seal itself must be impermeable to moisture and must maintain its integrity in the face of thermal-shock. The conventional mechanical seals are moisture permeable and do not readily maintain their integrity in the face of thermal-shock.

SUMMARY OF THE INVENTION

The present invention is directed to a structural design for a cell feed-through that permits a high torque on the cell terminal post connection, wherein the feed-through has a very low impedance, volume and weight, presents an excellent thermal shock properties, and is hermetic to moisture.

An object of the present invention is to provide a battery cell designed to minimize the torque on the feed-through seal that results from torque applied to the external terminal.

It is another object of the present invention to provide a battery cell designed to extend the life and durability of the battery.

It is still another object of the present invention to provide feed-throughs with very low impedance, volume and weight.

It is yet another object of the present invention to provide feed-throughs with excellent thermal shock properties.

It is still another object of the present invention to provide feed-throughs that are hermetic to moisture and other impurities.

The present invention achieves the first of the above objects by providing a plurality of pass-throughs, each having its own seal, which are connected to a terminal plate to which the terminal post is connected. That is, the terminal post does not pass directly through the cell housing and, therefore, does not transfer torque directly to the seals. Instead, the plurality of pass-throughs off-set the shear torque load from a single location—i.e., the terminal post as in the conventional design—to a distributed compression load on two or more locations. Because the seals are thus not torqued, but are compressed instead, they are not as easily damaged.

That is, each pass-through includes an anchor portion which is attached to the inside of the cell housing by, for example, welding or by heating the housing to expand the "holes" and dropping the pass-through into position. A post member passes through the anchor portion, and is connected to the terminal plate as well as to the electrodes within the cell. An insulating seal is then disposed between the anchor portion and the post member. Thus, when the terminal post is torqued, a compression force is placed on the insulating seals. This arrangement provides an insulating seal which maintains its integrity in the face of torque on the terminal post.

The present invention achieves the remaining objects by providing a glass-metal pass-through. That is, the insulating seal is hermetically sealed to the metal post member and to the metal anchor portion. Therefore, the seal is not moisture permeable and, therefore, does not allow contaminants to enter the cell housing.

DESCRIPTION OF THE PREFERRED EMBODIMENT

Figure 1:
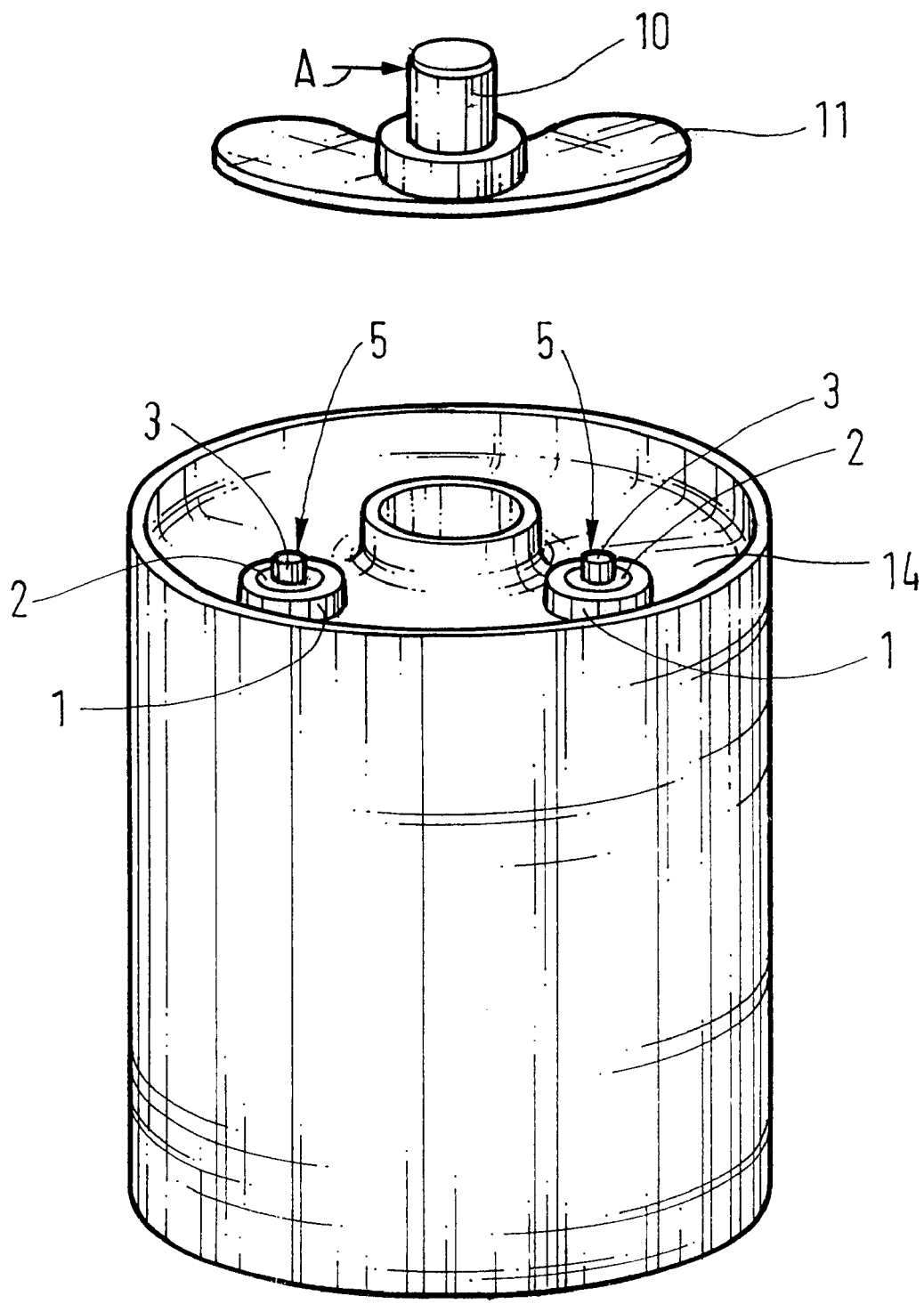
FIG. 1 is an exploded view of the battery cell showing the terminal plate and its corresponding post members removed from the pass-throughs.

The following is a detailed description of the invention with references to FIGS. 1 to 7. FIG. 1 shows an exploded view of the battery cell of the preferred embodiment. The battery in FIG. 1 is similar to a conventional battery in that it contains an outer cell housing 14 and a terminal post 10. The electrodes of the battery are contained inside the cell housing 14. The cell housing 14 can be made of many different types of materials but preferably, it is made of stainless steel. The cell housing can also be made in different shapes and sizes depending on its intended use. When the battery is being used, a load is placed on terminal post 10. The terminal post 10 provides the electrical conduit for the voltage stored in the battery to be used by the applied load. It is essential that the terminal post 10 be electrically connected, either directly or indirectly, to the electrodes within the cell housing. The terminal post 10 can be connected indirectly to the electrodes using a terminal plate 11 as shown in FIG. 1.

The terminal post 10 of the battery is connected to the top side of the terminal plate 11. The bottom side of the terminal plate 11 covers a plurality of pass-throughs 5 which are connected to the electrodes inside the cell housing 14. The pass-throughs 5 serve to connect the electrodes to the battery terminal post 10. In the illustrated embodiment, there are two pass-throughs 5, although the invention is not limited in this respect. In fact, in some respect it is advantageous to have more pass-throughs 5 to off-set the shear torque applied to the terminal post 10. The battery terminal assembly is better shown in FIG. 2, FIG. 3 and FIG. 4.

Figure 2:
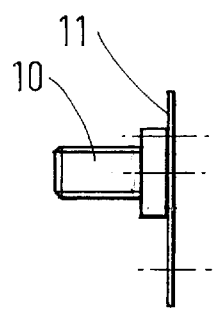
FIG. 2 is a side view of the terminal plate showing its connection to the terminal post.

FIG. 2 shows a side view of the terminal post 10 and the terminal plate 11 of the illustrated embodiment. The terminal post 10 is disposed on the terminal plate 11 by, for example but not limited to, welding. The terminal plate 11 is a thin but durable conductive plate. The thickness of the terminal plate 11 is not critical. The terminal plate 11 can be of any shape or size and should not be limited to the shape or size disclosed in any of the figures. Additionally, the position of the terminal post 10 on the terminal plate 11 is not critical and therefore should not be considered a limitation but, as shown, centering the terminal post 10 on the terminal plate 11 is preferred.

Figure 3:
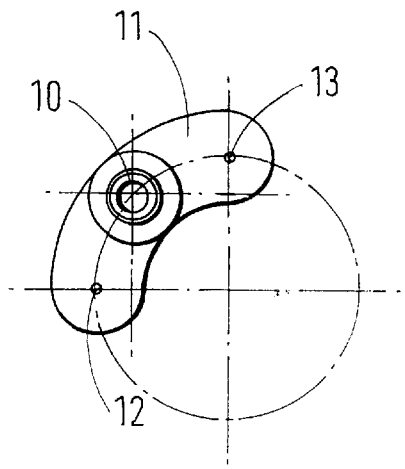
FIG. 3 is a top view of the terminal plate showing its connection to the terminal post and the distributed compression loads locations.
Figure 5:
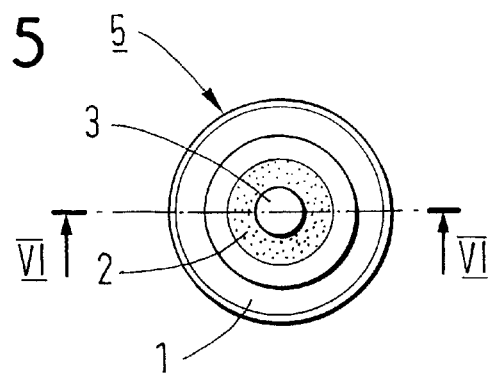
FIG. 5 is a top view of the pass-through showing the glass seal between the post member and the anchor portion.
Figure 6:
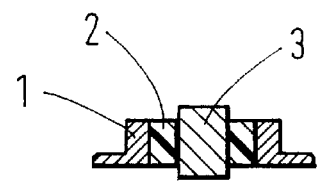
FIG. 6 is a sectional view of the pass-through along the VII—VII line of FIG. 4 showing the glass seal between the post member and the anchor portion.
Figure 7:
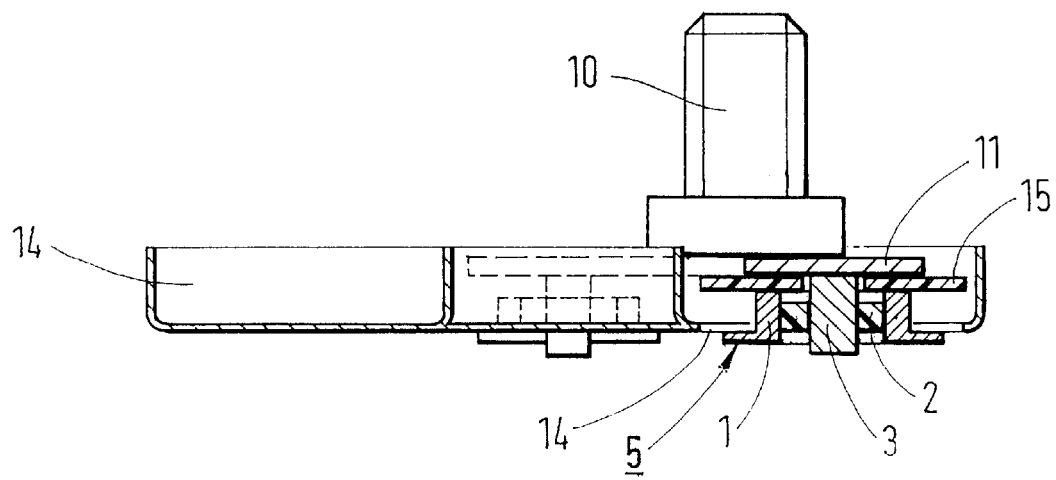
FIG. 7 is a sectional view of the cell along the VII—VII line of FIG. 4.

FIG. 3 is a top view of the terminal plate 11 of the preferred embodiment. As described earlier, the terminal post 10 is disposed onto the terminal plate 11. FIG. 3 also shows positions of compression load locations 12, 13 where the pass-throughs 5 are located. In this embodiment, the locations are determined by constructing an imaginary circle having the center located at the center of the top of the cell housing 14. The radius of the imaginary circle is chosen so that the imaginary circle edge passes through the center of the terminal post 10. The centers of the compression load locations 12, 13 are then chosen along the edge of the imaginary circle such that the locations are equidistant from the terminal post 10 and form a right angle at the center of the cell housing 14. It should be understood that the above description relates to the preferred embodiment of the invention and that the pass-throughs 5 may be located at any other desired location. The exact positions of this embodiment should not be taken as limitations to this invention. The locations of the compression load locations 12, 13 can be located anywhere along on the terminal plate 11. As stated previously, there may be more than two compression load locations.

Figure 4:
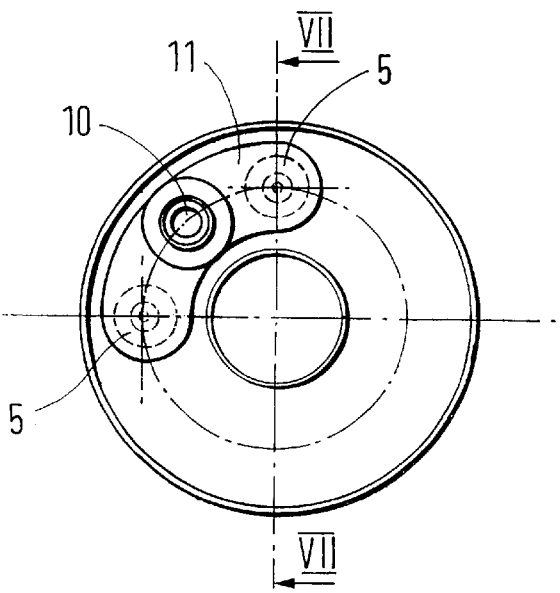
FIG. 4 is a top view of the cell showing the terminal plate and its connections to the terminal post and the pass-throughs.

FIG. 4 shows the terminal plate assembly of FIG. 3 as disposed on the cell housing 14. As stated previously, in this embodiment the centers of the terminal post 10 and the pass-throughs 5 are located along the edge of an imaginary circle whose center is located at the center of the top of the cell housing 14. The pass-throughs 5 are positioned underneath the terminal plate 11. The shape and position of the terminal plate 11 and the pass-throughs 5 may vary as long as the pass-throughs 5 are beneath the terminal plate 11.

Referring to FIGS. 1–7, the functions of the pass-throughs 5 and their components are further described. Specifically, each pass-through 5 includes an anchor portion 1, an insulating seal 2 and a post member 3. The anchor portion 1 is secured to the interior of the cell housing 14 by, for example, welding. The post member 3, which is connected to the electrodes within the cell housing 14, is made of a conductive metal and passes through a hole provided in the center of the anchor portion 1 and protrudes from the anchor portion to allow for electrical connection at each end. The post member 3 is attached to the bottom side of the terminal plate 11 thereby providing a connection between the electrodes and the terminal plate 11 as noted above, the terminal plate is electrically connected to the electrodes. Hence, the post member is electrically connected to the positive or negative electrode. An electrical insulating filler 15 is disposed between the terminal plate 11 and the anchor portion 1. This electrical insulating filler 15 prevents an electrical arching from occurring since the anchor portion is preferably made of metal. The electrical insulating filler 15 can be left out of the present invention so long as the terminal plate 11 is lifted off of the anchor portion 1 by the post member 3 so as to prevent electrical arching between the terminal plate 11 and the anchor portion 1.

According to the preferred embodiment, the post member 3 is welded to the terminal plate 11 although the invention is not limited. An insulating seal 2 is disposed between the post member 3 and the anchor portion 1. The insulating seal 2 serves many purposes. The first purpose is to provide a water-proof seal. The second purpose is to absorb a portion of any shear torque that is applied to the terminal post 10. A final purpose is to aid in keeping the post member 3 in its proper position. The pass-through 5 and its components are further shown in FIG. 5 and FIG. 6.

In the preferred embodiment shown, the anchor portion 1 and the post member 3 are made of metal (preferably molybdenum) while the insulating seal is made of glass. This combination results in a glass-to-metal seal having excellent thermal-shock properties while having a very low impedance, volume and weight.

The materials used to form the pass-through may vary as long as the seal is hermetic to moisture and other contaminants and possesses the same qualities as the insulating seal 2 described above. The thickness of the insulating seal 2 does not have to be uniform although it is preferred in the present embodiment. The anchor portion 1, the post member 3 and the opening in the anchor portion 1 may vary in shape and size as long as their electromechanical and positional properties described above remain.

As noted above, the advantage of the present invention is as follows. Moreover, in the embodiment of FIG. 1, the terminal post 10 is indirectly connected to the electrodes within the cell housing 14 through the terminal plate 11 and the post members 3 of the pass-throughs 5. Thus, any force A (see FIG. 1) applied to terminal post 10 is transferred to the terminal plate 11 and distributed to the post members 3 of the pass-throughs 5 as a compression force to the insulating seals 2. The compression force that is distributed to the insulating seals 2 via the post members 3 of the pass-throughs 5 is smaller than the shear force applied to the terminal post 10. Specifically, the resulting compression force is a fraction of the applied force A and is approximately determined by the dividing the applied force A by the number of pass-throughs 5. As can be seen, the more pass-throughs 5 disposed in the surface of the cell housing 14, the smaller the resulting compression force actually applied to the insulating seals 2. Therefore, the seals last longer so that the battery life is extended.

An additional advantage to the present embodiment is that the resulting force on the insulating seals 2 is a compression force and not a shear torque. The seals are not as easily damaged by compression forces as they are from shear torque. Once again, the less damage occurring to the seals, the longer the life of the battery.

What is claimed:

1. A feed-through arrangement for an electrochemical cell having a cell housing and an electrode within the cell housing, the feed-through arrangement comprising:
    a terminal plate having a top and a bottom side disposed adjacent to the cell housing;
    a terminal post, attached to said plate, for attaching a load to the electrochemical cell; and
    a plurality of pass-through members each of said pass-through members including an anchor portion for connection to the cell housing and having an opening therein, a post member passing through the opening and being connected to the electrode at one end and the terminal plate at the opposite end, and an insulating seal disposed between the post member and the anchor portion.

2. The feed-through arrangement of claim 1, wherein a filler is disposed between said terminal plate and said cell housing.

3. The feed-through arrangement of claim 1, wherein said insulating seal is made of glass.

4. The feed-through arrangement of claim 3, wherein said post member and said anchor portion are made of metal so as to form a glass-to-metal seal.

5. The feed-through arrangement of claim 1, wherein said insulating seal is hermetic to moisture.

6. The feed-through arrangement of claim 2, wherein said filler is adjacent to the bottom of said terminal plate and adjacent to said cell housing.

7. The feed-through arrangement of claim 6, wherein said insulating seal is made of glass.

8. The feed-through arrangement of claim 7, wherein said post member and said anchor portion are made of metal so as to form a glass-to-metal seal.

9. The feed-through arrangement of claim 6, wherein said insulating seal is hermetic to moisture.

10. The feed-through arrangement of claim 1, wherein said plurality of pass-through members separate said terminal plate from laying adjacent to said cell housing.

11. The feed-through arrangement of claim 10, wherein said insulating seal is made of glass.

12. The feed-through arrangement of claim 11, wherein said post member and said anchor portion are made of metal so as to form a glass-metal seal.

13. The feed-through arrangement of claim 10, wherein said insulating seal is hermetic to moisture.

* * * * *